United States Patent [19]
Pfundstein et al.

[11] 3,809,361
[45] May 7, 1974

[54] SHUTOFF VALVE

[75] Inventors: Karl Pfundstein, Frankenthal; Erich Fallert, Mannheim, both of Germany

[73] Assignee: Bopp & Reuther GmbH, Mannheim-Waldhof, Germany

[22] Filed: Aug. 15, 1972

[21] Appl. No.: 280,887

[30] Foreign Application Priority Data
Apr. 27, 1972  Germany............................ 2220584

[52] U.S. Cl................. 251/305, 251/173, 251/162
[51] Int. Cl...................... F16k 1/226, F16k 25/00
[58] Field of Search ........... 251/304, 305, 306, 307, 251/308, 333, 173, 192, 162, 359

[56] References Cited
UNITED STATES PATENTS

| | | | |
|---|---|---|---|
| 2,302,695 | 11/1942 | Kalix.................................. | 251/301 |
| 3,343,805 | 9/1967 | Felton................................ | 251/306 |
| 3,666,235 | 5/1972 | Scott.................................. | 251/306 X |
| 3,485,476 | 12/1969 | Hemphill .......................... | 251/305 X |
| 3,093,966 | 6/1963 | Englehart et al. ............... | 251/298 X |

*Primary Examiner*—William R. Cline
*Assistant Examiner*—Ira S. Lazarus
*Attorney, Agent, or Firm*—Michael S. Striker

[57] ABSTRACT

A shutoff valve is formed of a valve body defining a passage. A valve member has a substantially oval disk-shaped portion and an elastic sealing ring extending around the periphery of the disk-shaped portion.

The disk-shaped portion is mounted for movement about a pivot axis extending across said passage. The valve body has a valve seat located in the flow passage in a predetermined plane and to one side of the pivot axis. The valve seat has a surface which includes a pair of first surface portions located near the opposite ends of the pivot axis at one side of the axis and lying on a first imaginary conical surface having its vertex located at one side of said plane. The valve seat surface includes a pair of second surface portions located near the opposite ends of the pivot axis at the other side of the axis and lying on a second imaginary conical surface whose vertex is located at the other side of the valve seat plane. The valve member is pivotable about the axis between an open position and a closed position in which the sealing ring is wedged against the first and second surface portions of the seat surface.

9 Claims, 12 Drawing Figures

SHUTOFF VALVE

BACKGROUND OF THE INVENTION

The invention relates to shutoff valves, and more particularly to shutoff valves having a pivoting valve member.

Still more particularly the invention relates to shutoff valves comprising a valve body defining a flow passage and a valve plate mounted in the passage for pivotal movement about an axis eccentric to the valve plate, i.e., about an axis offset from the general plane of the valve plate.

The invention furthermore relates to shutoff valves wherein the valve body has a generally annular valve seat, and wherein the valve plate is provided on its peripheral surface with an elastic sealing means which engages the valve seat when the valve member is in closed position.

Prior-art shutoff valves of the type in question suffer from various disadvantages. One construction is known wherein the valve seat surface is a truncated conical surface. The eccentrically pivotable valve disk has a sealing face (usually provided with an O-ring) which is movable into tangency with the valve seat surface. In this construction, the sealing ring on the valve disk slides along a generally circular surface of the conical valve seat, and when the valve member is moved into closed position this does not result in any wedging of the O-ring into the space between the peripheral surface of the valve disk and the conical valve seat. Sealing action accordingly must be effected solely through the provision of a rather thick O-ring on the periphery of the valve disk, or in the inner periphery of the valve seat. This construction is not entirely satisfactory, because the pre-stressing of the O-ring provided on the valve disk should optimally be carefully controlled to account for the different wear experienced by different portions of the ring. Moreover, since the sealing action is effected solely by provision of the ring, a decrease in the thickness of the ring can quickly lead to a loss of proper sealing effectiveness.

An attempt has been made to improve this situation by designing an eccentric-disk valve whose sealing ring tends to be wedged into the space between the valve disk periphery and the valve seat, when the valve is closed. That construction also makes use of a truncated-cone valve seat surface, but the axis of the cone is inclined relative to the longitudinal axis of the pipe-like valve body. With that construction, a specially configurated sealing ring is provided on the valve body, and the provision of the sealing ring on the valve body results in an annular, radially inwardly protruding flow obstruction upon which sediment undesirably accumulates. Moreover, with such valve constructions a significant wedging effect only occurs at the top and the bottom of the valve disk, i.e., at the portions of the valve disk periphery farthest from the pivot axis. The wedging action decreases progressively along the disk periphery in direction toward the pivot axis. It frequently happens for this reason that proper sealing effectiveness cannot be maintained at that region of the valve disk periphery nearest the eccentric pivot axis.

SUMMARY OF THE INVENTION

It is accordingly the general object of the present invention to overcome the disadvantages of the prior art.

It is a more particular object to provide a novel shutoff valve construction which overcome such disadvantages.

It is a further object to provide a shutoff valve wherein a valve disk, or other valve member, cooperates with the valve seat in a wedging manner, substantially along the entire periphery of the valve member, and wherein accordingly the major part of the sealing effectiveness can result from such wedging action.

It is a particular object to provide a shutoff valve wherein the valve disk, or other valve member, can effect wedging of a sealing ring with real sealing effectiveness, particularly in the middle region of the valve member, i.e., in the region of the valve member nearest the eccentric pivot axis.

These objects, and others which will become more understandable hereafter, can be achieved with a shutoff valve comprising a valve body which defines a flow passage. A valve member includes a substantially oval disk-shaped portion and an elastic sealing ring extending around the periphery of the oval portion. The valve member is mounted for movement about a pivot axis extending transversely across the flow passage. The valve body has a valve seat located in the passage in a predetermined plane at one side of the pivot axis. The valve seat has a surface which includes a pair of first surface portions respectively located near the opposite ends of the axis at one side of the axis and lying on a first imaginary conical surface whose vertex is located at one side of said plane. The valve seat surface further includes a pair of second surface portions respectively located near the opposite ends of the axis and at the other side of the axis and lying on a second imaginary conical surface whose vertex is located at the other side of said plane. The valve member is pivotable about the axis between an open position and a closed position in which the sealing ring is wedged against the first and second surface portions of the valve seat surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
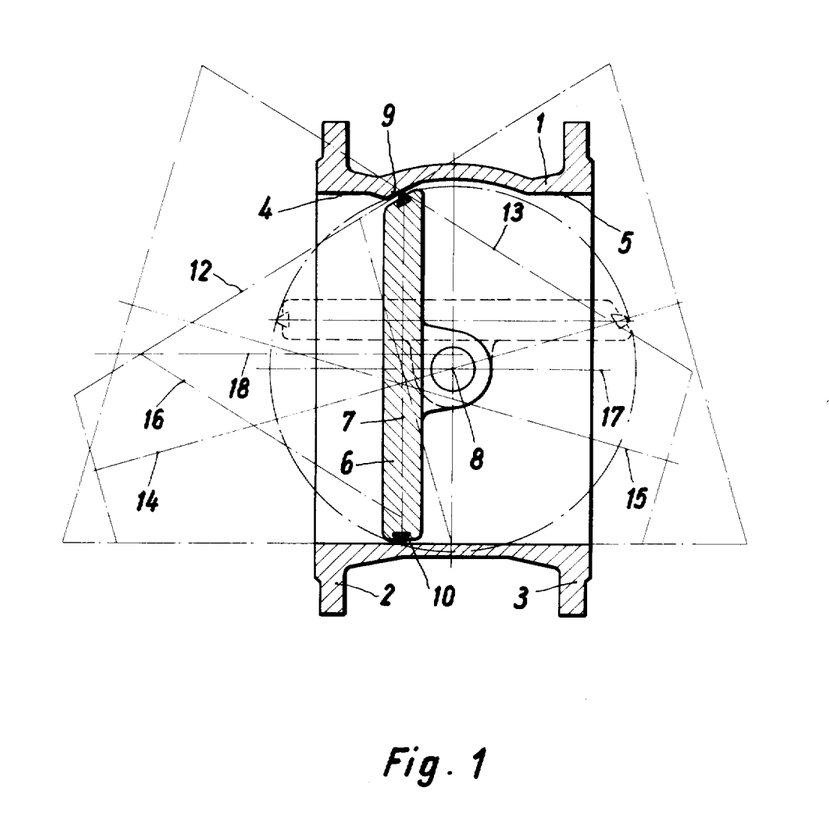
FIG. 1 is a sectional view of a shutoff valve according to the invention.

FIG. 1 depicts in longitudinal section a shutoff valve according to the invention. The valve comprises a pipe-like valve body 1 having two connecting flanges 2, 3 which define end openings of circular cross-section, to permit easy incorporation of the valve into a pipe system. As will be self-evident, the valve body 1 defines a flow passage for the flow of fluid in generally horizontal direction, in this example.

Figure 3:
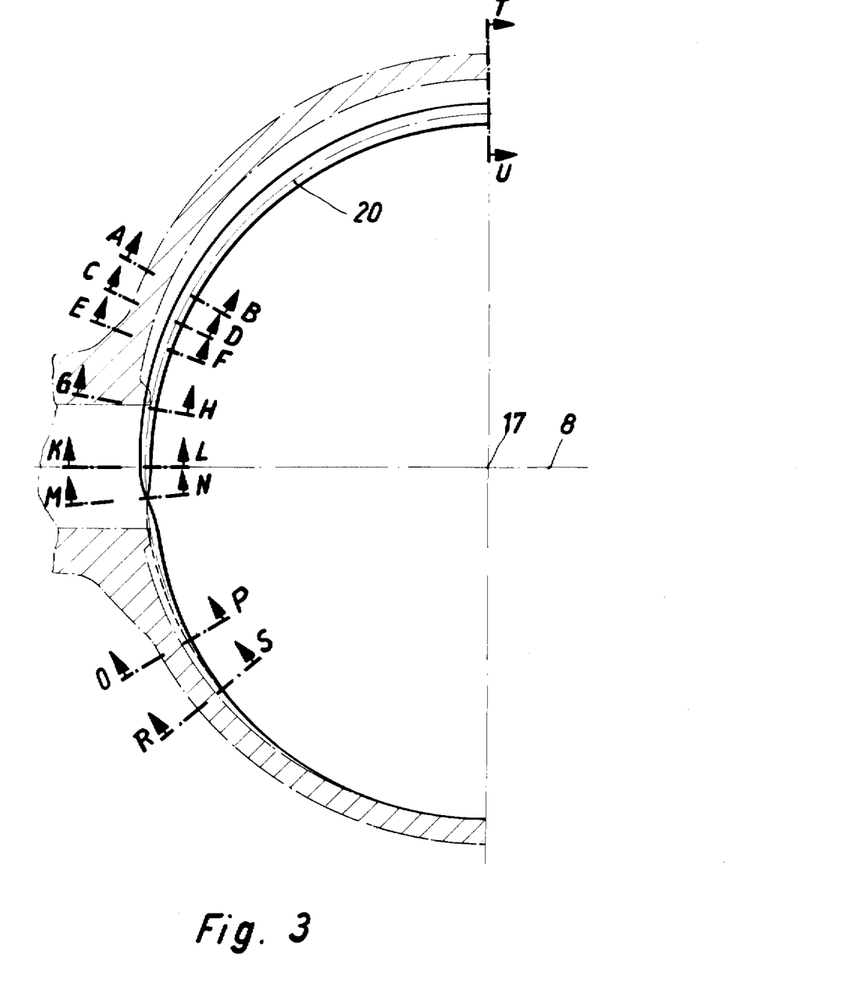
FIG. 3 is an axial end view of the valve seat of the valve shown in FIG. 1.

The valve body 1 has a valve seat generally identified with reference numeral 9. The surface of valve seat 9 is illustrated in FIG. 3, and is there identified with reference numeral 20. Valve seat 9 is of generally annular configuration and is located within a predetermined plane. It will be appreciated that the location within a single plane need be only approximate.

A valve member 6, here in the form of a disk-shaped valve plate, is pivotally mounted within the valve body by mounting axle 8. In this embodiment, the sealing action between the peripheral surface of the valve disk 6 and the valve seat 9 is accomplished predominantly by the wedging therebetween of an elastic sealing ring 10 provided on the periphery of the disk 6 and secured thereto by vulcanization, or in other suitable manner.

The general concept of the invention can be understood by considering the configuration of the valve disk 6 and the valve seat 9 in the illustrated embodiment.

Figure 2:
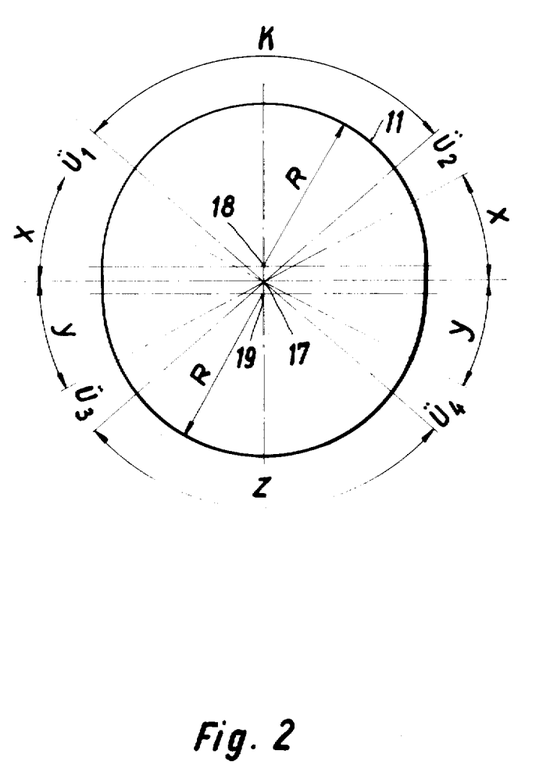
FIG. 2 is a view of the outermost outline of sealing ring 10 of FIG. 1.

FIG. 2 is a view of the outermost outline 11 of the elastic sealing ring 10 of FIG. 1. It will be appreciated that the median periphery of disk 6, i.e., the curve formed by intersection of the peripheral surface of disk 6 with median plane 7 of FIG. 1, will be of substantially identical outline, although somewhat smaller. Likewise, the general annular outline of the valve seat surface 20 (half of which latter is depicted in FIG. 3) will also be approximately that shown in FIG. 2.

Sealing ring 10 has a pair of first segments X located near the opposite ends of the pivot axis and to one of the pivot axis. Valve seat surface 20 (FIG. 3) has first surface portions whose curvature corresponds to the outline of segments X, and, and against which segments X are wedged when the valve disk 6 is in the closed position of FIG. 1.

The first surface portions of valve seat surface 20, corresponding to segments X of sealing ring 10, lie on a first imaginary conical surface, shown in FIG. 1 as having a first cone axis 14. The (non illustrated) vertex of conical surface 12 is located to one side (leftwards) of the general plane in which valve seat 9 is located.

Returning to FIG. 2, sealing ring 10 has a pair of second segments Y located near the opposite ends of the pivot axis and located at the side of the pivot axis opposite the side at which are located the aforementioned first segments X. Valve seat surface 20 (FIG. 3) has a pair of second surface portions whose curvature corresponds to the curved outline of segments Y, and against which segments Y are wedged when the valve disk 6 is in the closed position of FIG. 1.

The second surface portions of valve seat surface 20, corresponding to segments Y of sealing ring 10, lie on a second imaginary conical surface 13, shown in FIG. 1 as having a second cone axis 15. The (non-illustrated) vertex of conical surface 13 is located to the right of the general plane in which valve seat 9 is located, i.e., is located at the axial side of valve seat 9 opposite to the axial side at which is located the vertex of first conical surface 12.

Returning to FIG. 2, sealing ring 10 has a third segment Z whose outline is that of the arc of a circle having a radius R and a center downwardly displaced by a predetermined distance from the horizontal level of the pivot axis. Valve seat surface 20 (FIG. 3) has a third surface portion whose curvature corresponds to the curved outline of third segment Z and against which segment Z is wedged when the valve disk 6 is in the closed position of FIG. 1.

The third surface portion of valve seat surface 20, corresponding to segment Z of sealing ring 10, lies on the surface of an imaginary right circular cylinder having a horizontal axis downwardly displaced from the horizontal level of the pivot axis.

As shown in FIG. 1, the valve body 1 is of generally cylindrical configuration and has a generally cylindrical inner peripheral surface, which is interrupted in the region of the valve disk at the upper side of the valve body (as seen in FIG. 1). At the lower side of the valve body, however, the cylindrical inner peripheral surface of the valve body 1 is uninterrupted.

The third surface portion of valve seat surface 20, corresponding to segment Z of sealing ring 10, is tangent to the inner peripheral surface of the valve body at the lowermost region of the latter (as seen in FIG. 1). This is particularly evident from FIG. 3, at the lowermost portion of the Figure.

Returning to FIG. 2, sealing ring 19 furthermore includes a pair of transition segments $U_3$, $U_4$ which merge smoothly from second segments Y into third segment Z. Valve seat surface 20 has a pair of transition surface portions corresponding to transition segments $U_3$, $U_4$, and these merge smoothly from the aforementioned second surface portions into the aforementioned third surface portion.

Sealing ring 10 has a fourth segment K whose curved outline lies on a circle of radius R whose center is upwardly displaced (as seen in FIG. 1) from the horizontal level of the pivot axis by a distance equal to the downwards displacement from the pivot axis level of the center of the aforementioned circle associated with sector Z. Valve seat surface 20 has a fourth surface portion whose curvature corresponds to the curved outline of segment K of sealing ring 10, and against which ring 10 is wedged when the valve disk 6 is in the closed position of FIG. 1.

The fourth surface portion of valve seat surface 20, corresponding to segment K of sealing ring 10, lies on an imaginary third conical surface 16 (FIG. 1) whose vertex is located to the left of valve seat 9 and whose horizontal cone axis 18 is upwardly displaced from the horizontal level of the pivot axis defined by axle 8.

Finally, sealing ring 10 has a pair of additional transition segments $U_1$ and $U_2$ which merge smoothly from first segment X into fourth segment K. Valve seat surface 20 (FIG. 3) has a pair of additional transition surface portions whose curvature correspond to the curved outline of segments $U_1$, $U_2$ and against which segments $U_1$, $U_2$ are wedged when the valve disk 6 is in the closed position of FIG. 1.

Figure 4:
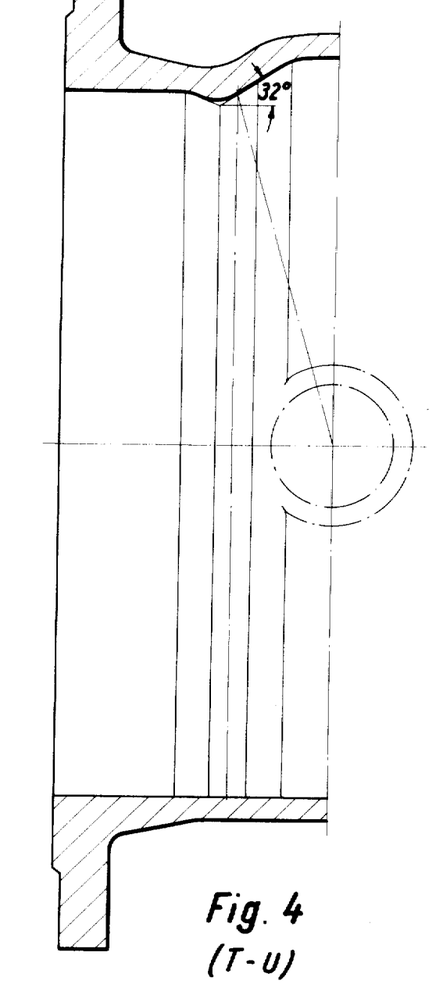
FIGS. 4–12 are longitudinal sections through the valve seat shown in FIG. 3, showing how the inclination of the valve seat relative to the general direction of flow decreases along the valve seat periphery in direction towards the valve-disk pivot axis, how the inclination reverses direction in the region of the valve-disk pivot axis, and how the inclination increases with an opposite sense in direction away from the valve-disk axis.
Figure 5:
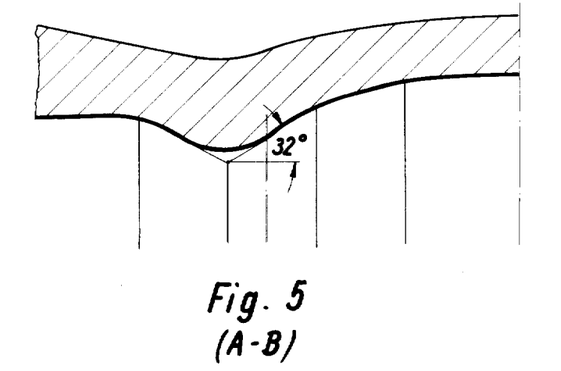
Figure 6:
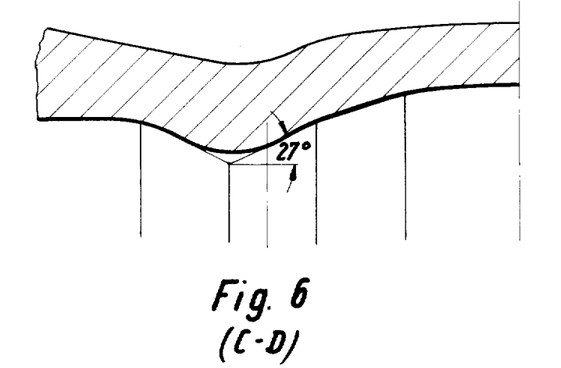
Figure 7:
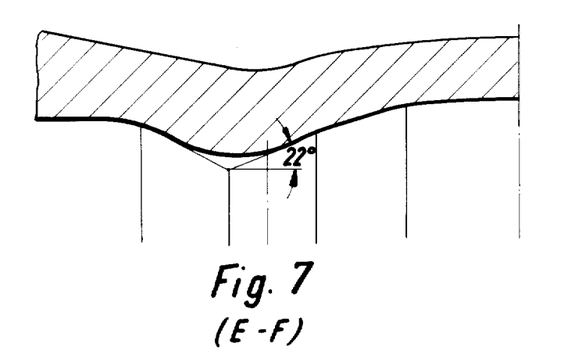
Figure 8:
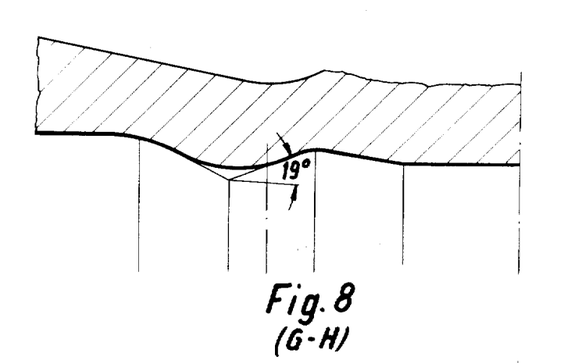
Figure 9:
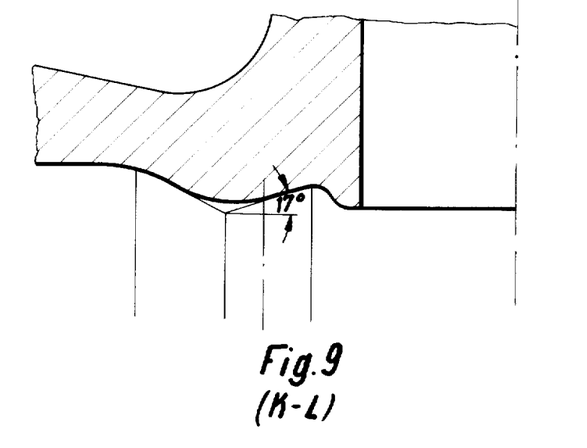
Figure 10:
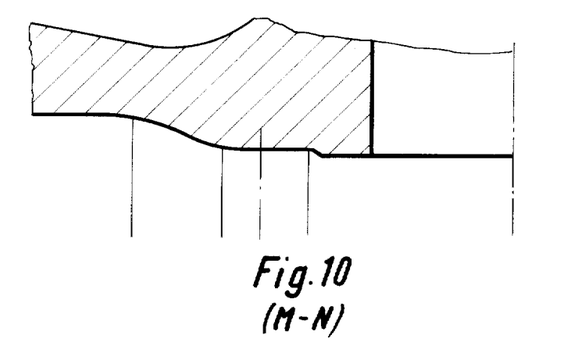
Figure 11:
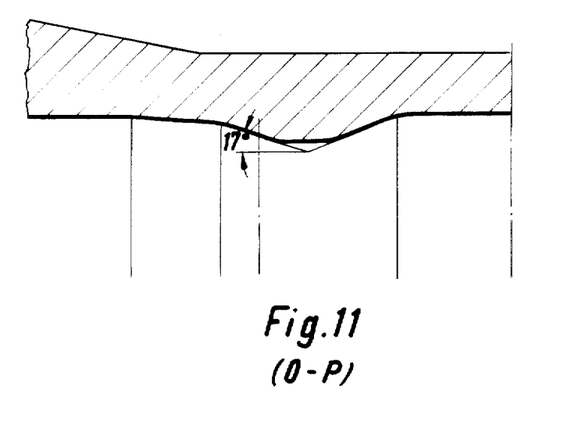
Figure 12:
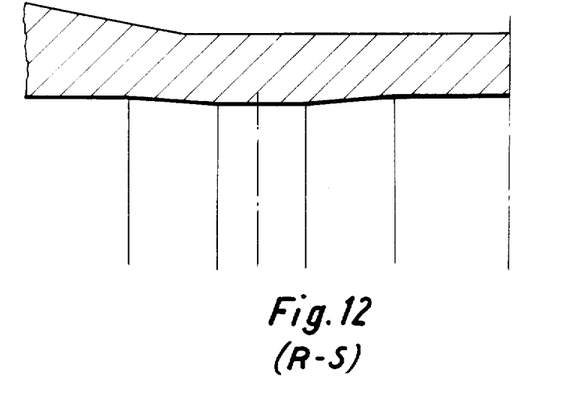

The configuration of the valve seat surface 20 is illustrated in FIG. 3. At the top of FIG. 3, it will be seen that the valve seat surface 20 is inclined at a substantial angle (32° see FIG. 4) with respect to the horizontal. This angle of inclination decreases as one considers portions of the valve seat nearer the axle 8; for instance it is only 27° at section C–D (FIG. 6), only 17° at section at section K–L (FIG. 9) and zero at section M–N (FIG. 10). As one proceeds further downwards, the inclination of the valve seat reverses, and the angle of inclination increases. At section O-P (FIG. 11) for instance, the inclination is opposite to that of sections T-U, A-B, etc. and has an angle of 17°. However, as one proceeds still further down, the angle of inclination again decreases to zero, because the fourth surface portion (corresponding to segment Z) lies on the surface of a right circular cylinder, and is thus not inclined relative to the horizontal, as can be seen from FIG. 12.

In the embodiment illustrated, it is assumed that the valve body will be disposed in space as depicted in FIG. 1, i.e., that in closed position valve disk 6 will be approximately vertical and that the fourth surface portion of valve seat surface 20 (corresponding to segment Z) will in fact be lowermost. When the valve is so oriented, the tangency of the lowermost portion of the valve seat surface and the lowermost region of the inner periphery of the valve body, is particularly advantageous. The lowermost portion of the valve seat surface does not project into or obstruct the flow path. As a result, there will be no accumulation of sediment at the lowermost region of the valve seat.

With regard to this lowermost region of tangency, it is noted that the problem of poor wedging action has always been most acute in the region of the pivot axis. Accordingly, the non-conical configuration of the lowermost portion of the valve seat surface (corresponding to segment Z) does not lessen the sealing effectiveness, because a satisfactory wedging action will anyway usually occur with such valves at the region of the valve seat furthest from the pivot axis. If desired, the lowermost valve seat surface portion (corresponding to segment Z) could also be inclined (like the uppermost portion corresponding to segment K).

The principal advantage of the illustrated construction is that, for the first time, pronounced wedging action is made to occur at that portion of the valve seat surface nearest the pivot axis. As the valve disk 6 moves from open to closed position (as seen in FIG. 1), segments X of sealing ring 10 are wedged leftwards against the valve seat surface; segments Y of sealing ring 10 are wedged rightwards against the valve seat surface. Such mutually opposite wedging action in the region of the valve seat surface near the pivot axis has never been achieved in this manner before, and at least provides a simple remedy to the problem of leakiness at this region.

Trial-and-error experimentation has indicated the advantageousness of orienting the axes 14, 15 of cones 12, 13 at an identical but opposite angle relative to the flow direction, to effect an advantageous transition for fluid passing from an ordinary pipe through the valve into a further length of pipe. However, this exact geometry is not considered absolutely necessary for realizing the broad concept of the invention.

Experience has also indicated the advantageousness of making the valve seat surface 20 of generally oval annular outline, somewhat elongated in vertical direction, in correspondence to the vertically elongated oval outline of sealing ring 10, as seen in FIG. 2. One advantage resulting from such configuration is that the transition, along the valve seat surface 20, between the first surface portions (corresponding to segments X) and the second surface portions (corresponding to segments Y) can be somewhat more gradual; this may be a factor of practical importance when, for instance, the valve seat is cast.

It is also an advantage to configurate the fourth surface portion (corresponding to segment K) so that it lies on the surface of a cone whose cone axis is transverse to the valve seat plane and displaced from the horizontal level of the pivot axis, because such design facilitates machining of that part of the valve seat surface, if the valve seat is in fact machined.

However, it is thought somewhat more advantageous to form the valve housing and/or the valve member 6 by a precision-casting method, for instance the Croning-method, because the production of the valve is thereby accomplished in a very inexpensive manner. Any dimensional imprecision is more than overcome by the improved wedging action of the construction according to the invention.

It will be understood that each of the elements described above, or two or more together, may also find a useful application in other types of constructions differing from the types described above.

While the invention has been illustrated and described as embodied in a shutoff valve, it is not intended to be limited to the details shown, since various modifications and structural changes may be made without departing in any way from the spirit of the present invention.

In the drawing, conical surfaces 12, 13 and 16 have been depicted as portions of right circular cones. It is emphasized, however, that the term "conical surface" is being broadly used. The conical surfaces need not be right circular cones, nor circular cones. Moreover, while the conical surfaces depicted have clear-cut (although non-illustrated) vertices, it is quite possible for the surfaces involved to be only approximately conical, i.e., tapering, without being surfaces of high geometrical regularity or definition; for instance they may taper without tapering into a single precisely defined vertex.

Without further analysis, the foregoing will so fully reveal the gist of the present invention than others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A shutoff valve, comprising a valve body defining a passage; a valve member including a substantially oval disk-shaped portion and an elastic sealing element extending around said oval portion; means mounting said valve member for movement about a pivot axis extending transversely across said passage; and a valve seat located in said passage in a predetermined plane at one side of said axis, said valve seat having a surface including a pair of first surface portions respectively located near opposite ends of said axis at one side of said axis and lying on a first imaginary conical surface having its vertex located at one side of said plane and a pair of second surface portions respectively located near the opposite ends of said axis and at the other side of said axis and lying on a second imaginary conical surface whose vertex is located at the other side of said plane, said valve member being pivotable about said axis between an open position and a closed position in which said sealing element is wedged against said first and second surface portions of said seat surface.

2. A valve as defined in claim 1, wherein said first and second conical surfaces have respective cone axes, and wherein said cone axes are inclined at equal angles with respect to said plane and are mutually inclined.

3. A valve as defined in claim 2, wherein said valve body has a substantially cylindrical inner peripheral surface, and wherein said first and second conical surfaces are substantially tangent to said inner peripheral surface.

4. A valve as defined in claim 1, wherein said valve body is elongated and has a longitudinal axis normal to said plane.

5. A valve as defined in claim 1, wherein said valve body has a substantially cylindrical inner peripheral surface, and wherein said valve seat surface further comprises a third surface portion located at the same side of said pivot axis as said second portions, and most remote from said pivot axis, said third surface portion being substantially tangent to said inner peripheral surface.

6. A valve as defined in claim 5, wherein said valve seat surface further comprises a pair of transition surface portions merging smoothly from said second surface portions into said third surface portion.

7. A valve as defined in claim 1, wherein said valve body is elongated and has a longitudinal axis, and wherein said valve seat surface further comprises a third surface portion located at the same side of said pivot axis as said second portions and most remote from said pivot axis, and a fourth surface portion located at the same side of said pivot axis as said first portions, and most remote from said pivot axis, said fourth surface portion lying on a third imaginary conical surface having vertex located at that side of said plane at which is located the vertex of said first conical surface, and said third conical surface having a third cone axis parallel to said longitudinal axis but spaced from said pivot axis in direction towards said fourth surface portion.

8. A valve as defined in claim 7, wherein said valve seat surface further comprises a pair of additional transition surface portions merging smoothly from said first surface portions into said fourth surface portion.

9. A valve as defined in claim 1, wherein said valve seat is unitary with the remainder of said valve body.

* * * * *